US012654308B2

(12) United States Patent
Otten et al.

(10) Patent No.: US 12,654,308 B2
(45) Date of Patent: Jun. 16, 2026

(54) EXOSKELETON DEVICE AND METHOD

(71) Applicant: FESTOOL GMBH, Wendlingen (DE)

(72) Inventors: Bernward Otten, Hamburg (DE);
Robert Weidner, Bohlsen (DE)

(73) Assignee: Festool GmbH, Wendlingen (DE)

( * ) Notice: Subject to any disclaimer, the term of this
patent is extended or adjusted under 35
U.S.C. 154(b) by 153 days.

(21) Appl. No.: 18/682,814

(22) PCT Filed: Aug. 12, 2022

(86) PCT No.: PCT/EP2022/072716
§ 371 (c)(1),
(2) Date: Feb. 9, 2024

(87) PCT Pub. No.: WO2023/017173
PCT Pub. Date: Feb. 16, 2023

(65) Prior Publication Data
US 2024/0351190 A1      Oct. 24, 2024

(30) Foreign Application Priority Data

Aug. 13, 2021    (DE) ..................... 10 2021 208 903.8

(51) Int. Cl.
| *B25J 9/16* | (2006.01) |
| *B25J 9/00* | (2006.01) |
| *B25J 19/02* | (2006.01) |

(52) U.S. Cl.
CPC ........... *B25J 9/0006* (2013.01); *B25J 9/1674*
(2013.01); *B25J 19/02* (2013.01)

(58) Field of Classification Search
CPC ........ B25J 9/0006; B25J 9/1674; B25J 19/02;
B25J 9/1615; B25J 19/06; B25J 13/085;
(Continued)

(56) References Cited

U.S. PATENT DOCUMENTS

| 5,662,693 A | 9/1997 | Johnson et al. |
| 2007/0255190 A1 | 11/2007 | Sadok |

(Continued)

FOREIGN PATENT DOCUMENTS

| CN | 105213155 | 1/2016 |
| CN | 107943021 | 4/2018 |

(Continued)

OTHER PUBLICATIONS

JP6108551B2_Description_20250901_1627.pdf (translation of
JP6108551B2 specification) (Year: 2025).*
(Continued)

*Primary Examiner* — Bao Long T Nguyen
(74) *Attorney, Agent, or Firm* — HSML P.C.

(57) ABSTRACT

An exoskeleton device including an exoskeleton with a base
section, a support section movably coupled to the base
section for supporting a body part of the human body, and
an actuator device acting on the support section for provid-
ing a support force for the body part. The exoskeleton device
further includes a sensor device for detecting a risk variable
which includes a movement of the support section and/or a
force and/or a pressure between the support section and the
body part, and a control device for controlling the actuator
device. The control device is configured to detect a risk state
on the basis of the detected risk variable, in which risk state
there is a risk of health impairment and/or damage, and to
initiate a safety measure in response to the detection of the
risk state, which comprises outputting a warning signal
and/or counteracting the risk state.

20 Claims, 5 Drawing Sheets

(58) Field of Classification Search
CPC ...... G05B 2219/40305; A61H 2201/50; A61H 2201/5007; A61H 2201/5061; A61H 2201/5084; A61H 2201/5058
See application file for complete search history.

(56) References Cited

U.S. PATENT DOCUMENTS

| | | | |
|---|---|---|---|
| 2016/0338897 A1 * | 11/2016 | Takenaka et al. | |
| 2018/0325766 A1 * | 11/2018 | Arzanpour | A61H 1/0237 |
| 2019/0001493 A1 | 1/2019 | Hyun et al. | |
| 2019/0070059 A1 | 3/2019 | Dalley et al. | |
| 2019/0105777 A1 | 4/2019 | Dalley et al. | |
| 2020/0306952 A1 | 10/2020 | Lashkari | |
| 2020/0346342 A1 | 11/2020 | Siegert et al. | |
| 2021/0007874 A1 | 1/2021 | Galiana Bujanda et al. | |

FOREIGN PATENT DOCUMENTS

| | | |
|---|---|---|
| DE | 10 2016 208 524 | 11/2016 |
| DE | 10 2017 222 609 | 1/2019 |
| DE | 10 2017 126 259 | 8/2019 |
| EP | 2 665 449 | 11/2017 |
| EP | 3 317 053 | 3/2022 |
| JP | 6108551 | 4/2017 |
| JP | 6108551 B2 * | 4/2017 |
| WO | 2018/193817 | 10/2018 |
| WO | 2021/010857 | 1/2021 |

OTHER PUBLICATIONS

JP6108551B2_Claims_20250904_1117.pdf (translation of JP6108551B2 claims) (Year: 2025).*

Examination Report issued in corresponding German Patent Application No. 10 2021 208 903.8, Apr. 27, 2022, 5 pages.

International Search Report and Written Opinion issued in International Application No. PCT/EP2022/072716, Dec. 19, 2022, 17 pages w/partial translation.

Office Action issued in corresponding Chinese Patent Application No. 202280055176.X, Mar. 31, 2026, 13 pages w/translation.

* cited by examiner

EXOSKELETON DEVICE AND METHOD

The invention relates to an exoskeleton device comprising an exoskeleton with a base section for attachment to a body section, in particular the torso, of a human body, a support section movably coupled to the base section for supporting a body part, preferably a limb, in particular an arm, of the human body, and an actuator device, in particular a pneumatic actuator device, acting on the support section for providing a supporting force for the body part, preferably the limb.

An exoskeleton is worn on the body and supports the musculoskeletal system in certain postures and movements. The preferred areas of use for exoskeletons are manual and industrial applications.

Exoskeletons are known, for example, from EP2665449B1, WO2018193817A1 and WO2021010857A1.

SUMMARY OF THE INVENTION

It is an object of the invention to increase the operational safety of the exoskeleton device.

The object is solved by an exoskeleton device according to claim 1. The exoskeleton device comprises a sensor device for detecting a risk variable which comprises a movement, in particular a rotational angular speed and/or a rotational angular acceleration, of the support section and/or a force and/or a pressure between the support section and the body part, preferably the limb, and a control device for controlling the actuator device, wherein the control device is configured to detect a risk state on the basis of the detected risk variable, in which risk state there is a risk of health impairment and/or damage, and to initiate a safety measure in response to the detection of the risk state, which safety measure comprises outputting a warning signal and/or counteracting the risk state.

With an exoskeleton, there may exist the risk that an uncontrolled upward movement of the support section injures the user's face. This may be caused by the arm slipping out of an arm attachment, in particular an arm shell, or an incorrect procedure when putting on or taking off the exoskeleton. This can result in uncontrolled movement of the support section providing the support force in the direction of the user's face. With active exoskeletons, this problem can occur, for example, if the support force of the exoskeleton is activated even though the user has not yet fully put on the exoskeleton.

By detecting the risk variable according to the invention, preferably an uncontrolled movement of the support section can be detected and the risk of injury to the user can be minimized by initiating the safety measure.

Preferably, the detection of the risk variable and the initiation of the safety measure can be used to achieve a correction or conscious manipulation of a user's movements in order to increase their safety or optimize the activity sequence. "Nudging" can be used to intuitively guide the user to the correct or optimal movement sequence.

Advantageous further developments are the subject of the dependent claims.

The invention further relates to a method according to claim 14.

BRIEF DESCRIPTION OF THE DRAWINGS

Further exemplary details and exemplary embodiments are explained below with reference to the figures. Thereby shows FIG. 1 a schematic side view of an exoskeleton device, FIG. 2 a schematic side view of an exoskeleton worn by a user, FIG. 3 a schematic detailed view of a support section of the exoskeleton, FIG. 4 a schematic rear view of the exoskeleton, and FIG. 5 a flow chart of an exemplary operation of the exoskeleton.

DETAILED DESCRIPTION OF THE INVENTION

In the following explanations, reference is made to the spatial directions x-direction, y-direction and z-direction, which are drawn in the figures and are aligned orthogonally to each other. The z-direction can also be referred to as the vertical direction, the x-direction as the depth direction and the y-direction as the width direction.

Figure 1:
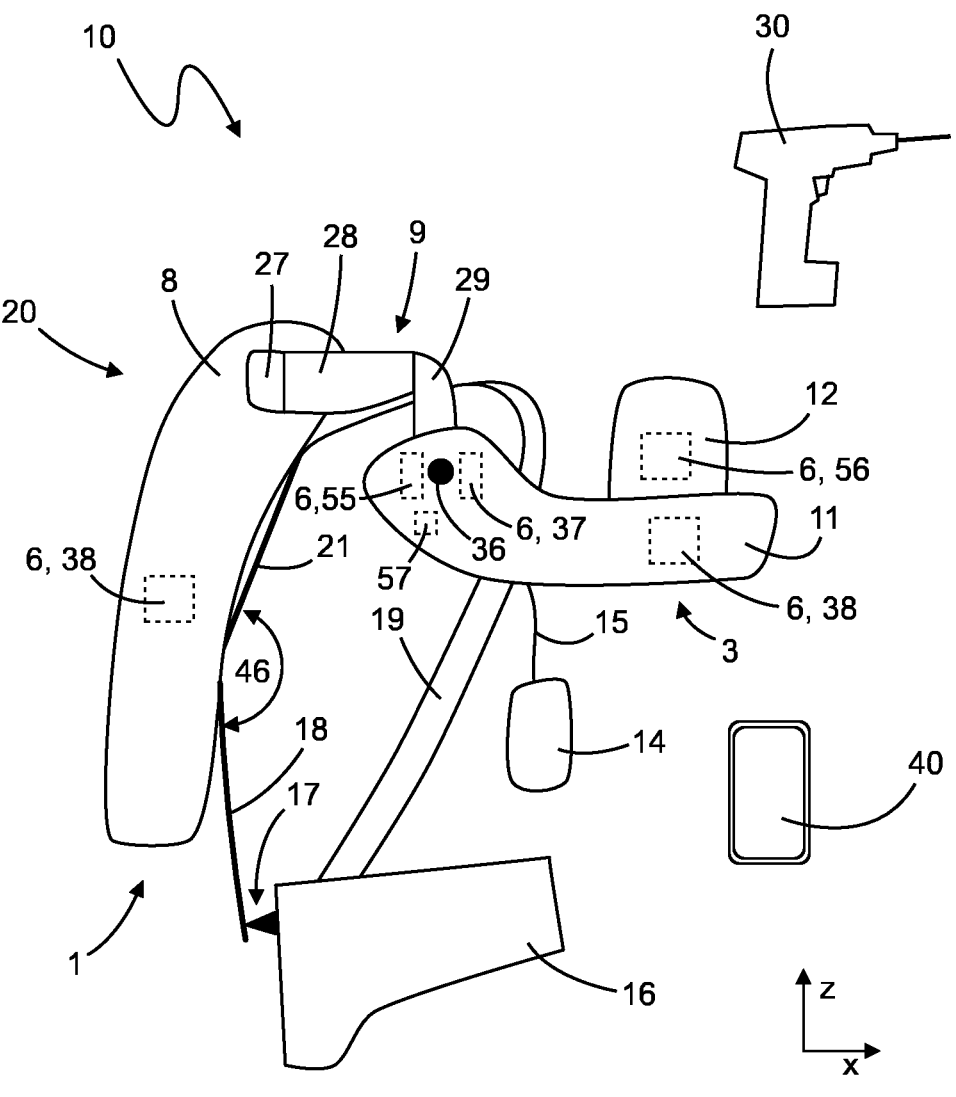

FIG. 1 shows a schematic representation of an exoskeleton device 10 comprising an exoskeleton 20 and optionally a tool 30 and/or a mobile device 40. The exoskeleton 20 can also be provided on its own. The tool 30 and/or the mobile device 40 are exemplarily provided separately from the exoskeleton 20, i.e. in particular not mechanically connected to the exoskeleton 20. The tool 30 is, for example, a power tool, in particular a cordless screwdriver and/or a drill and/or a grinder. The mobile device 40 is preferably a smartphone or a tablet. Optionally, the exoskeleton 20 is configured to communicate with the tool 30 and/or the mobile device 40, in particular wirelessly.

As an example, the exoskeleton 20 is aligned in an upright orientation with its vertical axis (which in particular runs parallel to a base section axis 62) parallel to the z-direction. In particular, the exoskeleton 20 is aligned in the upright orientation with its sagittal axis parallel to the x-direction. In a state in which the user has put on the exoskeleton 20, the sagittal axis of the exoskeleton 20 runs parallel to the sagittal axis of the user, i.e. in particular parallel to a direction from the rear—i.e. in particular the back of the user—to the front—i.e. in particular the chest of the user. The horizontal axis of the exoskeleton 20 runs in particular in the width direction of the exoskeleton 20 and/or parallel to the y-direction. In a state in which the user has put on the exoskeleton 20, the horizontal axis of the exoskeleton 20 runs parallel to the horizontal axis of the user, i.e. in particular parallel to a direction from a first shoulder of the user to a second shoulder of the user. The vertical axis of the exoskeleton 20, the sagittal axis of the exoskeleton 20 and the horizontal axis of the exoskeleton 20 are aligned orthogonally to each other.

The exoskeleton device 10 is designed in particular for manual and/or industrial use. Preferably, the exoskeleton device 10 is not designed for medical and/or therapeutic use.

The exoskeleton 20 is an active exoskeleton and in particular has an internal energy source from which the energy for the support force is provided. In particular, the exoskeleton 20 is an active exoskeleton for actively supporting the user's shoulder joint.

The exoskeleton 20 comprises a base section 1 for attachment to a body section of a human body of a user. By way of example, the base section 1 serves to be attached to the torso 2 of the human body.

The base section 1 comprises a main section and a textile carrying system, which is in particular detachably attached to the main section. By way of example, the main section serves to be worn on the back of the human body by means of the textile carrying system, in particular in a backpacklike manner. The main section comprises a back part 8, which is in particular elongated and which is expediently aligned with its longitudinal axis vertically and/or in the longitudinal direction of the user's back. For example, the longitudinal direction of the back part 8 extends along the longitudinal direction of the back. The main section further comprises a force transmission element 18, which is in particular strip-shaped and/or rigid and extends downwards from the back part 8 to a pelvic strap 16 in order to mechanically couple the back part 8 to the pelvic strap 16. The force transmission element 18 is expediently used to transmit a reaction force, which is transmitted from a support section 3 to the back part 8, further to the pelvic strap 16. As an example, the back part 8 is tubular and/or backpack-shaped. The back part 8 is in particular rigid. In particular, the back part 8 comprises an expediently rigid back part housing, which is made, for example, from an in particular rigid plastic and/or as a hard shell. The back part 8 expediently serves to transmit a force from the support section 3 to the force transmission element 18 and/or to accommodate components for controlling the support force.

The support section 3 can expediently be referred to as an arm actuator.

The force transmission element 18 is exemplarily sword-shaped and can also be referred to as a sword. Expediently, the force transmission element 18 is designed to be adjustable relative to the back part 8, in particular in order to change the vertical extent of the main section and/or a force transmission element angle 46 between the force transmission element 18 and the back part 8 facing the user's back. Expediently, the force transmission element 18 is mounted for translational and/or rotational movement relative to the back part 8 and, in particular, can be moved into various translational and/or rotational positions relative to the back part 8 and, in particular, can be locked. The translational movement is in particular vertical. The rotational movement is expediently performed about an adjustment axis aligned parallel to the y-direction.

The textile carrying system comprises, by way of example, the pelvic strap 16 and/or at least one, preferably two, shoulder straps 19. The pelvic strap 16 expediently forms a loop so that, when worn, it surrounds the torso 2, in particular the hips, of the user. Each shoulder strap 19 extends exemplarily from the main section, in particular from the back part 8, to the pelvic strap 16, expediently over a respective shoulder of the user when the exoskeleton 20 is worn.

The exoskeleton 20 further comprises, by way of example, a force transmission element joint 17, via which the force transmission element 18 is attached to the pelvic strap 16. The force transmission element joint 17 is designed, for example, as a ball joint and can be referred to as a sacral joint. When the exoskeleton 20 is worn, the force transmission element joint 17 is arranged in the lower back region of the user, in particular centered in the width direction.

By way of example, the textile carrying system also comprises a back net 21, which is arranged on the side of the back part 8 facing the user's back. When the exoskeleton 20 is worn, the back net 21 lies against the user's back, in particular at least partially and/or in the upper back region.

The exoskeleton 20 further comprises the support section 3 movably coupled to the base section 1 for supporting a body part, preferably a limb, in particular an arm 4, of the human body of the user. In particular, the support section 3 is designed to be attached to the body part, preferably the limb, in particular the arm 4, of the user. The support section

3 comprises, by way of example, an in particular rigid arm part 11 and an arm attachment 12 arranged on the arm part 11, which is designed, by way of example, as an arm shell. The arm part 11 is exemplarily elongated and, when worn, is aligned with its longitudinal axis in the direction of the longitudinal axis of the user's arm. As an example, the arm part 11 extends from the shoulder of the user to the elbow area of the user. The exoskeleton 20, in particular the arm part 11, ends at the elbow area of the user. The arm attachment 12 is used in particular to attach the support section 3 to the arm 4, in particular the upper arm, of the user. In particular, the arm shell surrounds the upper arm of the user, in particular at least partially, so that the upper arm can be held in the arm shell with a strap. The user's forearm is expediently not attached to the exoskeleton 20.

The body part is preferably a limb of the human body. For example, the body part is an arm of the human body. Furthermore, the body part may be the back of the human body. In this case, the base section expediently serves for attachment to a leg of the human body; i.e. the body section (to which the base section is to be attached) may be, for example, a leg in the case where the body part is the back.

As an example, the support section 3 is mounted so that it can pivot about a horizontal pivot axis relative to the base section 1, in particular relative to the back part 8. As an example, the support section 3 is mounted directly on a shoulder part 29. The horizontal pivot axis can also be referred to as the lifting axis 36. When the exoskeleton 20 is worn, the lifting axis 36 is located in the area of the user's shoulder. In particular, the exoskeleton 20 is designed to support the user's shoulder joint with the support section 3. When the exoskeleton 20 is worn, the user can perform a lifting movement with his arm 4 supported by the support section 3 by pivoting the support section 3 about the lifting axis 36. In particular, the lifting axis 36 can be aligned in the y-direction. Expediently, the lifting axis 36 always lies in a horizontal plane, for example an x-y plane. In particular, a horizontal plane is to be understood as an exactly horizontal plane and/or a plane that is tilted by a maximum of 10 degrees, 7 degrees or 5 degrees relative to a horizon.

The pivot angle 47 of the support section 3 about the lifting axis 36 relative to the base section 1 should also be referred to as the lifting angle. The pivot angle 47 has a reference value, in particular a minimum value, when the support section 3 is oriented downwards (in the case of a vertically oriented exoskeleton 20) and increases continuously up to a maximum value when the support section 3 is pivoted upwards. The minimum value is in particular a minimum value in terms of amount, for example zero.

As an example, the pivot angle 47 is defined as an angle between a support section axis 61 and a base section axis 62. The support section axis 61 extends in the longitudinal direction of the support section 3. Exemplarily, the support section axis 61 extends from the lifting axis 36 in the direction of the arm attachment 12. In a state in which the user has put on the exoskeleton 20, the support section axis 61 expediently extends parallel to an upper arm axis of the arm 4 supported by the support section 3. The base section axis 62 expediently represents a vertical axis of the base section 1 and extends vertically downwards, in particular in a vertical orientation of the base section 1, for example in a state in which the user has put on the exoskeleton 20 and is standing upright. As an example, the pivot angle 47 lies in a z-x plane.

The exoskeleton 20 comprises, by way of example, a shoulder joint arrangement 9, via which the support section 3 is attached to the base section 1, in particular the back part

8. The shoulder joint arrangement 9 expediently comprises a joint chain with one or more pivot bearings for defining one or more vertical axes of rotation. By means of the joint chain, it is expediently possible to pivot the support section 3 relative to the base section 1, in particular relative to the back part 8, in a preferably horizontal pivot plane, for example about a virtual vertical axis of rotation. In particular, the joint chain enables the user to pivot his arm 4, which is supported by the support section 3, about a vertical axis of rotation running through the user's shoulder, whereby the support section 3 is moved along with the arm 4. As an example, the joint chain is designed to be passive, so that the exoskeleton 20 does not provide any active support force in the direction of the horizontal pivot movement when the arm is pivoted in the preferably horizontal pivot plane.

The shoulder joint arrangement 9 is expediently arranged and/or designed in such a way that it defines a free space which, when the exoskeleton 20 is worn, is located above the shoulder of the user wearing the exoskeleton 20, so that the user can align his arm, which is supported by the support section 3, vertically upwards through the free space past the shoulder joint arrangement 9.

By way of example, the shoulder joint arrangement 9 comprises an inner shoulder joint section 27, which is mounted so as to be pivotable about a first vertical axis of rotation relative to the base section 1, in particular to the back part 8, by means of a first pivot bearing of the shoulder joint arrangement 9. By way of example, the shoulder joint arrangement 9 further comprises an outer shoulder joint section 28, which is mounted so as to be pivotable about a second vertical axis of rotation relative to the inner shoulder joint section 27 by means of a second pivot bearing of the shoulder joint arrangement 9. By way of example, the shoulder joint arrangement 9 further comprises a shoulder part 29 which is mounted so as to be pivotable about a third vertical axis of rotation relative to the outer shoulder joint section 28 by means of a third pivot bearing of the shoulder joint arrangement 9. Preferably, the inner shoulder joint section 27, the outer shoulder joint section 28 and the shoulder part 29 in the shoulder joint arrangement 9 are kinematically coupled to one another as the joint chain in such a way that the pivot angle of the inner shoulder joint section 27 relative to the base section 1 determines the pivot angle of the outer shoulder joint section 28 relative to the inner shoulder joint section 27 and/or the pivot angle of the shoulder part 29 relative to the outer shoulder joint section 28.

Figure 3:
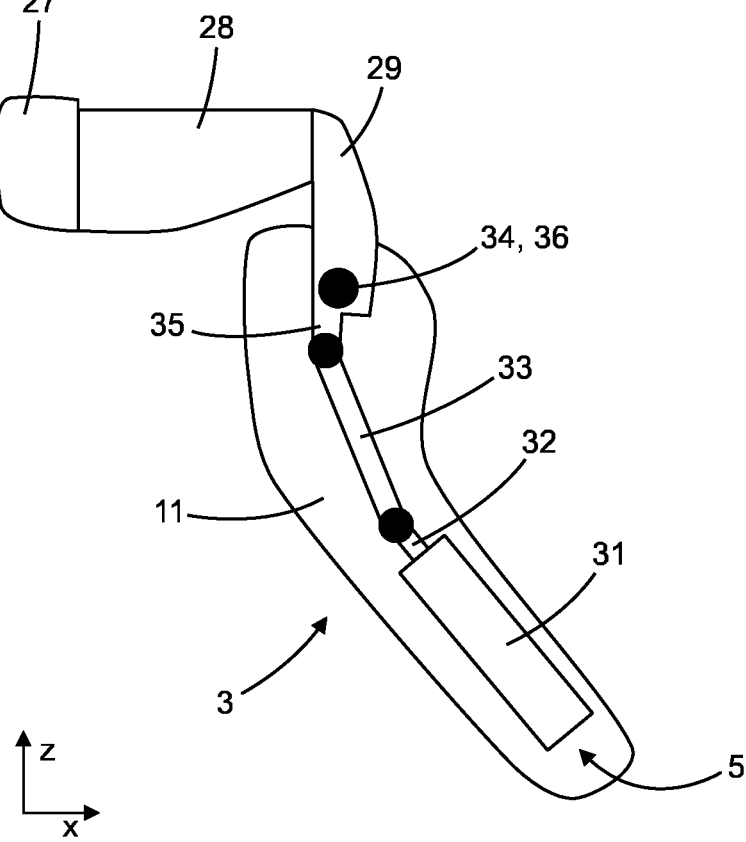

FIG. 3 shows a schematic detailed view of the support section 3, with components arranged within the arm part visibly shown. The arm part 11 expediently comprises an arm part housing, which is in particular rigid and made of plastic, for example.

The exoskeleton 20 comprises an actuator device 5 acting on the support section 3 to provide a support force for the body part, preferably the limb, exemplarily for the user's arm. By way of example, the actuator device 5 is arranged at least partially in the arm part 11.

The actuator device 5 is an active actuator device. Expediently, the exoskeleton 20 provides the support force by means of the actuator device 5 with a force component acting upwards in the direction of the pivoting movement about the lifting axis 36, which pushes the user's arm 4 upwards in the direction of the pivoting movement.

Preferably, the actuator device 5 comprises an actuator unit with an actuator member 32. The actuator unit can apply an actuator force to the actuator member 32 in order to provide the support force. The actuator member 32 is coupled to an eccentric section 35 arranged eccentrically to the lifting axis 36. The eccentric section 35 is part of the shoulder part 29, for example. By coupling the actuator member 32 to the eccentric section 35, the actuator force provides a torque of the support section 3 about the lifting axis 36 relative to the base section 1 and/or the shoulder part 29. Due to this torque, the support section 3 presses against the body part, preferably the limb, in particular the arm 4, of the user, in particular upwards, and thus provides the support force acting on the body part, preferably the limb, in particular the arm 4, of the user.

As an example, the actuator device 5 has a coupling element 33, in particular designed as a push rod, via which the actuator member 32 is coupled to the eccentric section 35.

Preferably, the actuator device 5 is a pneumatic actuator device and the actuator unit is expediently designed as a pneumatic drive cylinder 31. The actuator member 32 is the piston rod of the drive cylinder 31.

Alternatively, the actuator device may not be designed as a pneumatic actuator device. For example, the actuator device can be designed as a hydraulic and/or electric actuator device and, expediently, comprise a hydraulic drive unit and/or an electric drive unit as the actuator unit.

The drive cylinder 31, the actuator member 32 and/or the coupling element 33 are preferably arranged in the arm part housing.

The exoskeleton 20 expediently comprises a lifting pivot bearing 34, which provides the lifting axis 36. As an example, the support section 3 is attached to the shoulder joint arrangement 9 via the lifting pivot bearing 34.

Figure 4:
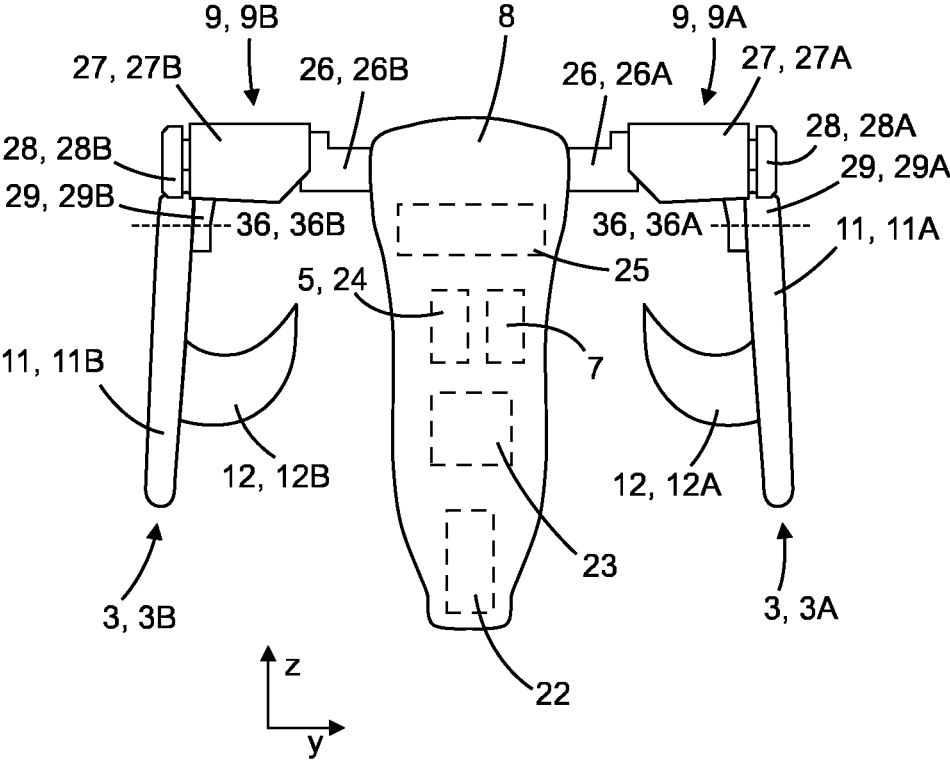

FIG. 4 shows a rear view of the exoskeleton 20, whereby the textile support system and the force transmission element 18 are not shown.

The exoskeleton 20 comprises, by way of example, one or more batteries 22, a compressor 23, a valve unit 24 and/or a compressed air tank 25, which are expediently part of the base section 1 and are arranged in particular in the back part housing.

By way of example, the rechargeable battery 22 is arranged at the bottom of the back part 8 and, in particular, is inserted into a rechargeable battery holder of the back part 8 from below. Expediently, the compressed air tank 25 is arranged in an upper region in the back part 8, exemplarily (in particular in the longitudinal direction of the back part 8 and/or vertical direction) above the valve unit 24, the control device 7, the compressor 23 and/or the rechargeable battery 22. The valve unit 24 and/or the control device 7 is (in particular in the longitudinal direction of the back part 8 and/or vertical direction) expediently arranged above the compressor and/or above the rechargeable battery 22. The compressor 23 is arranged (in particular in the longitudinal direction of the back part 8 and/or vertical direction) above the battery 22.

The battery 22 serves as an electrical power supply for the exoskeleton 20, in particular for the compressor 23, the valve unit 24, a sensor device 6 and/or a control device 7.

The compressor 23 is designed to compress air in order to generate compressed air. The compressed air tank 25 is designed to store compressed air-in particular the compressed air generated by the compressor 23.

The valve unit 24 expediently comprises one or more electrically operable valves and is designed in particular to influence a pneumatic connection from the compressed air tank 25 to a pressure chamber of the pneumatic drive cylinder 31, in particular to selectively establish and/or block the pneumatic connection. Expediently, the valve unit 24 is further designed to influence a pneumatic connection from the compressed air tank 25 to the environment of the exoskeleton 20 and/or a pneumatic connection from the pressure chamber of the drive cylinder 31 to the environment of the exoskeleton 20, in particular to selectively establish and/or block the pneumatic connection. The valve unit 24 is expediently part of the actuator device 5.

The exoskeleton 20 further comprises a sensor device 6. As an example, the sensor device 6 comprises an angle sensor 37 for detecting the angle of the support section 3 relative to the base section 1, in particular the arm part 11 relative to the shoulder part 29. This angle should also be referred to as the pivot angle 47 or the lifting angle. The angle sensor 37 is used in particular to detect the angle of the support section 3 about the lifting axis 36. The angle sensor 37 is designed, for example, as an incremental encoder and is arranged in particular on the lifting pivot bearing 34, in particular in the arm part 11 and/or in the shoulder part 29.

Preferably, the sensor device 6 further comprises at least one pressure sensor for detecting the pressure prevailing in the pressure chamber of the drive cylinder 31 and/or the pressure prevailing in the compressed air tank 25. The at least one pressure sensor is expediently arranged in the back part 8 and/or in the arm part 11.

The exoskeleton device 10, in particular the exoskeleton 20, expediently comprises a control device 7, which for example comprises a microcontroller or is designed as a microcontroller. The control device 7 is used in particular to control the actuator device 5, in particular the valve unit 24, in order to control the provision of the support force. Furthermore, the control device 7 is used to read out the sensor device 6, in particular to read out data recorded by the sensor device 6 and/or to communicate with the tool 30 and/or the mobile device 40. Preferably, the control device 7 is designed to adjust the pressure prevailing in the pressure chamber of the drive cylinder 31 by actuating the valve unit 24, in particular to closed-loop control the pressure, for example taking into account a pressure value recorded by means of the pressure sensor. In particular, the control device 7 is designed to increase the pressure prevailing in the pressure chamber by actuating the valve unit 24 in order to increase the support force and/or to reduce the pressure prevailing in the pressure chamber by actuating the valve unit 24 in order to reduce the support force.

According to a preferred embodiment, the control device 7 is designed to adjust the support force on the basis of the pivot angle 47 of the support section 3 detected in particular by means of the angle sensor 37. Expediently, the user can use his muscle strength to change the pivot angle 47 of the support section 3 by pivoting his arm 4, thereby influencing in particular the provision of the support force. In particular, the support force is low enough so that the user can change the pivot angle 47 of the support section 3 by pivoting his arm 4 using his muscle strength. The support force is limited, for example, by the design of the pneumatic system, in particular the compressor, and/or by the control device 7.

The control device 7 is preferably part of the exoskeleton 20 and is exemplarily arranged in the base section 1, in particular in the back part 8. Optionally, the control device 7 can be at least partially implemented in the mobile device 40.

As an example, the exoskeleton 20 comprises an operating element 14, which is expediently attached to the base section 1 via an operating element cable 15. The user can control the exoskeleton 20 via the operating element 14 and, in particular, activate, deactivate and/or set the support force to one of several possible force values greater than zero.

As an example, the exoskeleton 20 further has a connecting element 26, via which the shoulder joint arrangement 9 is attached to the base section 1, in particular the back part 8. The connecting element 26 is exemplarily designed as a pull-out element. The connecting element 26 is expediently adjustable in its position relative to the base section 1, in particular relative to the back part 8, in order to be able to adapt the position of the shoulder joint arrangement 9 and the support section 3 to the shoulder width of the user. In particular, the position of the connecting element 26 can be adjusted by pushing or pulling the connecting element 26 in or out of the back part 8.

By way of example, the exoskeleton 20 has a first support section 3A, a first shoulder joint arrangement 9A and a first connecting element 26A, as well as a second support section 3B, a second shoulder joint arrangement 9B and a second connecting element 26B. The components whose reference signs are provided with the suffix "A" or "B" are expediently each designed in correspondence with the components provided with the same reference sign number but without the suffix "A" or "B", for example identical or mirror-symmetrical, so that the explanations in this regard apply in correspondence.

The first support section 3A, the first shoulder joint arrangement 9A and the first connecting element 26A are arranged on a first, exemplarily the right, side (in width direction) of the base section 1, and serve to support a first, in particular the right, arm of the user.

The second support section 3B, the second shoulder joint arrangement 9B and the second connecting element 26B are arranged on a second, exemplarily the left, side (in width direction) of the base section 1 and serve to support a second, in particular the left, arm of the user.

The first support section 3A comprises a first arm part 11A, a first arm attachment 12A and/or a first actuator unit, in particular a first drive cylinder.

The second support section 3A comprises a second arm part 11B, a second arm attachment 12B and/or a second actuator unit, in particular a second drive cylinder.

Preferably, the control device 7 is designed to set a first support force for the first support section 3A by means of the first actuator unit and to set a second support force for the second support section 3B by means of the second actuator unit, which second support force is expediently different from the first support force.

The first shoulder joint arrangement 9A comprises a first inner shoulder joint section 27A, a first outer shoulder joint section 28A and a first shoulder part 29A. The second shoulder joint arrangement 9B comprises a second inner shoulder joint section 27B, a second outer shoulder joint section 28B and a second shoulder part 29B.

The first support section 3A is pivotable about a first horizontal lifting axis 36A relative to the base section 1 and the second support section 3B is pivotable about a second horizontal lifting axis 36B relative to the base section 1.

Figure 2:
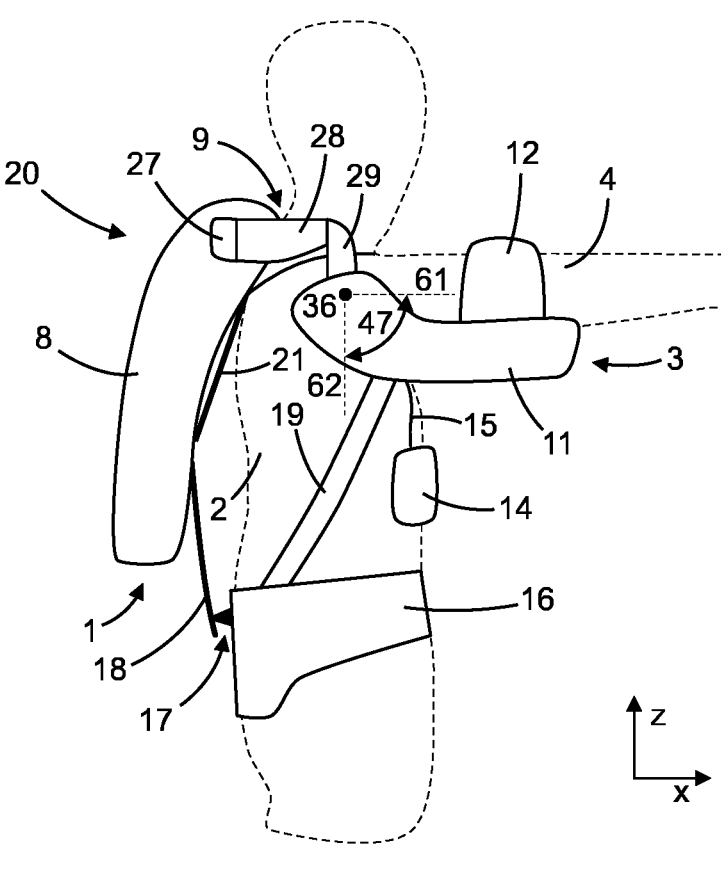

In FIG. 2, the exoskeleton 20 is shown in a state in which it is worn by a user, in particular worn as intended. By the formulation that the user is wearing the exoskeleton 20, in particular wearing it as intended, it is meant that the user has put on the exoskeleton, i.e. put it on, by way of example in that the user is wearing the back part 8 on his back like a backpack, has put on the pelvic strap 16 around his hips, the shoulder strap or shoulder straps 19 run over the shoulder or shoulders of the user and/or one or both arms of the user are attached to the respective support section 3 with a respective arm attachment 12.

By way of example, the exoskeleton 20 is designed to support the user during a lifting movement of a respective arm, i.e. during an upwardly directed pivoting of the respective support section 3 about a respective lifting axis 36, with a respective support force acting in particular upwards. Furthermore, the exoskeleton 20 is expediently designed to support or counteract the user during a lowering movement, i.e. during a downward pivoting of the respective support section 3 about a respective lifting axis 36, with a respective support force acting in particular upwards, or to deactivate or reduce the respective support force during the lowering movement.

The sensor device 6 is used to detect a risk variable. The risk variable can also be referred to as risk information. The risk variable preferably represents a movement of the support section 3. Preferably, the risk variable comprises a rotational angular speed and/or a rotational angular acceleration of the support section 3. Furthermore, the risk variable may comprise a force between the support section 3 and the body part, preferably the limb, in particular the arm 4, and/or a pressure between the support section 3 and the body part, preferably the limb, in particular the arm 4.

The control device, which is used in particular to control the actuator device 5, is configured to detect a risk state based on the detected risk variable, in which risk state there is a risk of health impairment and/or a risk of damage. The health impairment is in particular a physical injury to the user and/or a bystander, in particular due to a blow with the support section 3. The damage is, for example, damage to the exoskeleton 20 and/or an environment of the exoskeleton 20, in particular due to the exoskeleton 20 hitting the environment.

The following section describes in more detail how the risk variable is recorded:

The sensor device 6 comprises one or more sensors for detecting the risk variable. The sensor device 6 outputs at least one sensor signal to the control device 7.

As already mentioned above, the sensor device 6 comprises the angle sensor 37. Preferably, the risk variable is detected using the angle sensor 37. For example, the angle sensor 37 outputs a sensor signal, in particular an angle sensor signal, to the control device 7, which sensor signal indicates the current rotational position, in particular the pivot angle 47, of the support section 3, in particular relative to the base section 1. The control device 7 is expediently configured to obtain, in particular calculate, the risk variable on the basis of the sensor signal, in particular the angle sensor signal. In particular, the control device 7 is configured to calculate, on the basis of the sensor signal, in particular the angle sensor signal, a rotational angular speed and/or a rotational angular acceleration as the risk variable in particular by differentiating.

According to one possible embodiment, the sensor device 6 comprises a rotational angular speed sensor 55 for detecting the risk variable. For example, the rotational angular speed sensor 55 outputs to the control device 7 a sensor signal, in particular an rotational angular speed signal, which indicates the current angular rate of rotation of the support section 3, in particular relative to the support section 3. Expediently, the control device 7 uses the rotational angular speed detected by the rotational angular speed sensor 55 as the risk variable. The rotational angular speed sensor 55 is expediently arranged on or in the lifting pivot bearing 34.

In a preferred embodiment, the exoskeleton 20 is used for shoulder support during overhead work. The risk state is preferably determined by means of the rotational angular speed sensor 55. In particular, the control device 7 detects an increased speed and/or acceleration of one or both support sections 3 as the risk state, which increased speed and/or acceleration would not be possible with an arm correctly fixed in the arm shell due to an inertia of the arm or would not be usual in normal use. Expediently, the rotational angular speed sensor 55 measures the angular rate of rotation directly, so that in particular no conversion of the sensor values of the rotational angular speed sensor 55 has to be carried out in order to obtain the risk variable.

According to a further possible embodiment, the sensor device 6 comprises a force and/or pressure sensor 56 for detecting the risk variable. The force and/or pressure sensor 56 detects in particular a force and/or a pressure between the support section 3, in particular the arm attachment 12, and the body part, preferably the limb, in particular the arm 4. The force and/or pressure sensor 56 thus detects in particular how strongly the support section 3 presses against the body part, preferably the limb, in particular the arm 4, of the user. The force and/or pressure sensor 56 is preferably arranged on the support section 3, in particular on the arm attachment 12. Optionally, the force and/or pressure sensor 56 can be arranged remotely from the arm attachment 12 and/or the control device 7 can be configured to determine, in particular to calculate, the forces acting on the arm attachment 12 from movement data and/or a system model. The control device 7 uses the force and/or pressure detected by the force and/or pressure sensor 56 as the risk variable. According to an optional embodiment, the force and/or pressure sensor 56 detects a pressure distribution, in particular at a contact area with the human body of the user, for example on the arm attachment 12, and the control device 7 is configured to determine the risk variable on the basis of the pressure distribution.

According to a further possible embodiment, the sensor device 6 comprises at least one acceleration sensor 38 for detecting the risk variable. For example, an acceleration sensor can be present on the base section 1 and/or the support section 3 to detect the risk variable. The acceleration sensor 38 detects an acceleration, in particular a linear acceleration and/or an angular acceleration, preferably along a circular path around the lifting axis 36. Expediently, the acceleration sensor 38 is a multi-axis acceleration sensor. The control device 7 uses the acceleration detected by the acceleration sensor 38 as the risk variable and/or calculates the risk variable on the basis of the acceleration detected by the acceleration sensor 38, for example as speed.

According to an optional embodiment, a first acceleration sensor 38 is arranged on the support section 3 and a second acceleration sensor is arranged on the base section 1. When determining the risk state, the control device 7 is configured to take into account sensor signals—i.e. detected accelerations—from the first acceleration sensor 38 and the second acceleration sensor 38, in particular in order to selectively determine a first risk state or a second risk state and, expediently, to initiate a respective safety measure in accordance with the determined risk state. For example, the first risk state is a risk movement state in which the support section 3 moves too quickly relative to the base section 1 and/or has too high an acceleration relative to the base section 1. The second risk state is, for example, a risk total movement state in which the entire exoskeleton 20—i.e. the base section 1 and the support section 3—moves too quickly and/or has too high an acceleration, for example if the exoskeleton 20 is in free fall.

Preferably, the risk variable is thus detected by means of sensors that monitor the movement of the support section 3 or a pressure, for example a pressure distribution, at an interface to the body, e.g. in the arm shell. For this purpose, sensors for detecting the current rotational position, the angular speed/angular acceleration of the support section 3, the (multi-axial) speed/acceleration of the support section 3, and/or pressure and/or force sensors, e.g. in the arm shell, may preferably be present.

Furthermore, the sensor device 6 can comprise a rotational angular acceleration sensor for detecting the risk variable. In this case, the risk variable is expediently a rotational angular acceleration. Expediently, the control device 7 does not perform any additional conversion or time differentiation of the rotational angular acceleration detected by the rotational angular acceleration sensor in order to determine the risk variable. The control device 7 is configured to detect the risk status on the basis of a rotational angular speed of the support section 3 detected by the rotational angular speed sensor.

In the following, it shall be discussed in more detail how the risk status can be determined on the basis of the detected risk variable.

Preferably, the control device 7 is configured to detect the risk status on the basis of a comparison of the risk variable with a risk threshold value. The risk threshold value is, for example, a movement threshold value, in particular a rotational angle speed threshold value and/or a rotational angle acceleration threshold value, a force threshold value and/or a pressure threshold value.

According to an optional embodiment, the control device 7 is configured to determine a risk state from several possible risk states on the basis of one or more of the risk variables.

In particular, the control device 7 is configured to continuously detect, in particular to monitor, one or more risk variables and/or to continuously check whether one or more risk states are present.

Preferably, the risk state comprises a risk movement state in which there is a risk movement of the support section 3 in which there is a risk that the support section 3 strikes against the head, in particular the face, of the user of the exoskeleton 20. The risk movement is in particular a pivoting movement of the support section 3 relative to the base section 1, in particular about the lifting axis 36, preferably upwards.

For example, the determination of the risk movement state comprises a detection of an uncontrolled movement of one or more support sections 3 of the active exoskeleton 20 actively supported with a respective support force by the actuator device 5. The uncontrolled movement can be potentially dangerous for the user or bystanders. The exoskeleton device 10 is expediently designed to initiate a countermeasure following this detection in order to perform a controlled movement of the support section 3 and/or the actuator device 5 in order to avoid and/or reduce possible injuries to the user or bystanders.

Expediently, the control device 7 determines the risk movement state in response to the fact that the risk variable, in particular the rotational angular speed and/or the rotational angular acceleration of the support section 3 relative to the base section 1, exceeds a risk threshold value, in particular a rotational angular speed threshold value and/or a rotational angular acceleration threshold value. Expediently, the control device 7 has one or more risk threshold values for determining the risk movement state, which may also be referred to as risk movement threshold values. These one or more risk movement threshold values expediently characterize the risk movement state.

Optionally, the control device 7 can check whether the support section 3 is attached to the body part, preferably the limb, in particular the arm 4, as a (in particular additional) prerequisite for determining the risk movement state, for example by comparing a force or pressure detected by the force and/or pressure sensor with a force threshold value and/or a pressure threshold value. For example, the control device 7 determines the risk movement state in response to the detected force and/or pressure being less than the force threshold value and/or the pressure threshold value.

Preferably, the risk state comprises a risk attachment state in which the support section 3 does not support the body part, preferably not the limb, and/or is not attached to the body part, preferably not the limb. For example, the risk state is a state in which the user has partially put on the exoskeleton 20, in particular is wearing the back part 8 on his back and/or has put on the pelvic strap 16 around his waist, but has not attached the support section 3, in particular the arm attachment 12, to his body part, preferably not to his limb, in particular not to his arm 4, so that the support section 3 expediently does not support any body part, preferably no limb, in particular no arm 4, of the user. In particular, in the risk attachment state, at least the first support section 3A and/or the second support section 3B does not support any body part, preferably no limb, in particular no arm 4, of the user and/or is not attached to any body part, preferably no limb, in particular no arm 4, of the user.

The risk attachment state arises, for example, if the user's arm 4 of the exoskeleton 20 slips out of the arm attachment 12, in particular the arm shell, due to insufficient attachment during use of the exoskeleton 20, or if the user removes the arm from the arm attachment 12, in particular the arm shell, during operation—i.e. when the support force by the actuator device 5 is active. In particular, the risk state can arise if a user activates the support force without having attached one or both arms to the respective arm attachment 12A, 12B, in particular without having inserted one or both arms into the respective arm shell. In this risk state, the support section 3 can swing upwards unhindered and with the full force provided by the actuator device 5, in particular about the pivot axis 47, and hit the user on the head, in particular in the face, depending on the user's head position.

Expediently, the control device 7 is configured to determine the risk attachment state in response to the determination that a force and/or pressure detected by the force and/or pressure sensor 56 is less than a force and/or pressure threshold value. Expediently, the control device has one or more risk threshold values, in particular force and/or pressure threshold values, for determining the risk attachment state, which may also be referred to as risk attachment state threshold values. These one or more risk attachment state threshold values expediently characterize the risk attachment state. Optionally, the control device 7 can be configured to provide one or more risk attachment state threshold values as constant threshold values or to determine them on the basis of the support force.

Optionally, the sensor device 6 comprises a proximity sensor, which is arranged in particular in the arm attachment 12, for example in the arm shell. The proximity sensor is, for example, a capacitive proximity sensor and/or a capacitive proximity switch. In particular, the proximity sensor detects an approach of the arm by one or more electrical effects. The control device 7 is expediently designed to determine the risk state, in particular the risk attachment state, using the proximity sensor, preferably without providing the support force for this purpose with the support section 3.

Optionally, the control device 7 is configured to determine the risk state, in particular the risk attachment state, on the basis of a detected speed, in particular angular speed, and/or acceleration, in particular angular acceleration, of the support section 3 and a pressure in the drive cylinder 31. For example, the control device 7 is configured to determine an inertia, for example on the basis of a system model, on the basis of the detected speed, in particular angular speed, and/or acceleration, in particular angular acceleration, of the support section 3 and the pressure in the drive cylinder 31, and to infer the risk attachment state on the basis of the determined inertia, for example if the determined inertia is below a predetermined threshold value. The inertia relates in particular to the arrangement of the arm 4 (if this is attached to the support section 3) and the support section 3. If the support section 3 moves quickly even with little pressure, the control device 7 assumes that no arm is inserted and that the risk attachment state is present.

Preferably, the risk state comprises a risk usage state in which the support section 3 supports the body part, preferably the limb, in particular the arm 4, and moves at a speed greater than a speed threshold value and/or a force acts between the support section 3 and the body part, preferably the limb, which is greater than a force threshold value. The control device 7 is configured to detect the risk state on the basis of a comparison of a detected speed, in particular the rotational angular speed, of the support section 3 with the speed threshold value and/or on the basis of a comparison of the detected force and/or pressure with the force and/or pressure threshold value.

The risk usage state is given in particular if the user has put on the exoskeleton 20 correctly but is not using it optimally. Non-optimal use occurs, for example, if the user moves the support section 3 too quickly and/or too jerkily with his body part, in particular his limb, and/or if the user carries too heavy a load with his body part supported by the support section 3, in particular the limb.

In particular, the control device 7 is configured to monitor, using a/the force and/or pressure sensor, the force and/or pressure at one or more interfaces of the exoskeleton 20 to the user (e.g. at the arm shell), in particular in order to detect excessive force and/or pressure at the interface and, expediently, to throttle the support power, for example if a corresponding setting is present, for example by the user and/or in a preset. Optionally, the control device 7 is configured to use the force and/or pressure sensor 56 to detect whether the user is moving the support section 3 with an effort (greater than a force threshold value) against the direction of the support force and, for example, to reduce the support force in this case, for example up to a switching off of the actuator device 5.

According to an optional embodiment, the control device 7 is configured to use the detected movement of the support section 3, in particular a detected speed of the support section 3, for monitoring a movement sequence, and to draw the user's attention to a different, in particular better, mode of operation and/or a different, in particular more suitable, movement sequence, for example by means of a warning, in particular an optical, acoustic and/or tactile warning. For example, the exoskeleton device 10 comprises a warning lamp for issuing the warning and/or is designed to emit a warning sound as a warning and/or to cause the support section 3 to vibrate as a warning by means of the actuator device 5.

According to an optional embodiment, the control device 7 is configured to adjust the support force depending on a detected speed of the support section 3. The detected speed is, for example, the rotational angular speed determined using the angle sensor 37. In particular, the control device 7 is configured to reduce the support force more at a higher speed than at a lower speed.

In particular, the control device 7 is configured to adapt the support force to the speed of the support section 3, in particular to reduce the support force if the user's movements are too fast for a work process. In particular, the control device 7 is configured to indicate to the user a predetermined (in particular ergonomically optimal) speed of the support section 3 by adjusting the support force.

Expediently, the control device 7 has one or more risk threshold values for determining the risk usage state, which can also be referred to as risk usage state threshold values. Expediently, these one or more risk usage state threshold values characterize the risk usage state.

Preferably, the risk threshold value can be set automatically and/or manually by a user. For example, the risk threshold value can be set by the user via the operating element 14 and/or the mobile device 40.

Preferably, the control device 7 has one or more risk threshold values for determining a risk state. In particular, the control device 7 has different risk threshold values for determining different risk states. The control device 7 is expediently configured to compare different risk threshold values with one or more identical sensor signals, for example a force and/or pressure detected by a force and/or pressure sensor, to determine different risk states. In particular, the control device 7 can be configured to determine several risk states on the basis of one sensor signal and several risk threshold values.

Expediently, various risk threshold values are present, for example a first risk threshold value for a movement, in particular the speed and/or acceleration of the support section 3, and/or a second risk threshold value for the force and/or pressure detected by the force and/or pressure sensor 56, and the various risk threshold values are expediently automatically and/or manually adjustable.

According to a preferred embodiment, the control device 7 is configured to set the risk threshold value as a function of an angle, in particular the pivot angle 47, between the support section 3 and the base section 1. For example, the control device 7 is configured to set the risk threshold value lower if the angle, in particular the pivot angle 47, is greater than if the angle is smaller. In particular, the control device 7 is configured to set the risk threshold value lower the further the support section 3 is pivoted upwards and/or the greater the pivot angle 47 is. In particular, the control device 7 sets the risk threshold value lower in certain areas, especially close to the user's face.

The risk threshold value is, for example, a switch-off threshold and can be adjustable for the user and/or can be automatically adapted to at least one selected operating parameter and/or an operating situation. For example, the switch-off threshold for the exoskeleton 20 for shoulder support can be defined as a function of the pivot angle 47.

Expediently, the control device 7 sets a lower switch-off threshold when one or both support sections 3 are closer to the user's head than when one or both support sections 3 are further away from the head.

According to a preferred embodiment, the control device 7 has at least two manually and/or automatically selectable presets, each of which has at least one preset characteristic that defines a support force specification as a function of at least one input variable, in particular an angle of the support section 3, for example the pivot angle 47, whereby the at least two presets differ in their preset characteristic. The control device 7 is configured to use a preset selected from the at least two presets to determine the support force specification as a function of the input variable and to set the support force on the basis of the support force specification. The presets can also be referred to as application profiles and the preset characteristics can also be referred to as application profile characteristics.

Preferably, each preset also comprises a respective risk threshold value and the control device 7 is configured to detect the risk status on the basis of the risk threshold value of the selected preset.

The risk threshold value of the respective preset is expediently adjustable by the user when configuring a preset manually.

Expediently, the at least one risk threshold value of each risk state can be set by the user during manual configuration of a preset.

The safety measure will be discussed in more detail below.

Preferably, the control device 7 is configured to initiate, in response to the detection of the risk state, the safety measure, which comprises issuing a warning signal and/or counteracting the risk state.

The control device 7 is configured to reduce the support force and/or brake the support section 3 as a safety measure, in particular by activating the actuator device 5.

Preferably, the control device 7 is configured to deactivate the actuator device 5 as a safety measure and/or to cause active braking of the actuator device 5 and/or to cause a reduction in the rigidity of the actuator device 5.

For example, the control device 7 is configured to switch the actuator device 5 powerless as a safety measure in response to a speed of the support section 3 that is above a risk threshold value—i.e. in particular in response to the risk movement state. Due to gravity and mechanical friction, the support section 3 is then braked and does not touch the user's head or only touches it at a low speed. Preferably, the control device 7 is configured to switch off the support force in response to an angular speed of the support section 3 greater than 75 degrees/second, preferably greater than 150 degrees/second.

Expediently, the control device 7 is configured not to initiate the safety measure, in particular the powerless switching of the actuator device, in a predetermined angular range of the pivot angle 47, in particular in an angular range of 0-30 degrees.

Preferably, the exoskeleton 20 is configured to perform active braking of the support section 3 as a safety measure. Active braking is performed in particular by means of the actuator device 5.

For example, the pneumatic drive cylinder 31 is designed as a double-acting cylinder with two pressure chambers and, for active braking, the pressure chamber counteracting the support force is supplied with air, in particular pressurized from the compressed air tank 25.

Furthermore, the exoskeleton 20 can be designed to achieve active braking by disconnecting a fluidic connection of a pressure chamber (of the pneumatic drive cylinder 31, in particular the single-acting pneumatic drive cylinder) to the compressed air tank 25, so that a vacuum forms in the pressure chamber as the piston rod continues to move.

Optionally, the exoskeleton 20 can comprise an electric braking system for active braking of the support section 3. In particular, an electric motor working in the opposite direction to the movement of the support section 3 can be used to generate a counterforce for braking the support section 3. Preferably, the electric motor is part of the actuator device and can optionally also be used to provide the support force. Furthermore, the exoskeleton can have an eddy current brake to achieve active braking of the support section 3.

Optionally, the exoskeleton 20 is configured to perform, as the safety measure, one or more measures, which cushion or prevent a possible impact of the support section 3 on the body of the user or a bystander. For example, the exoskeleton 20 comprises an airbag system which is activated in the event of an imminent impact, in particular on the basis of the risk variable, and buffers the energy of the support section 3 on impact with the head, for example by inflating an air cushion. The control device 7 is expediently configured not to initiate the inflation of the air cushion in a predetermined angular range of the pivot angle 47, in particular in an angular range of more than 90 degrees, preferably more than 120 degrees.

As already mentioned above, the control device 7 is expediently configured to reduce the stiffness of the actuator device 5. This is done, for example, by releasing compressed air from the pressure chamber of the pneumatic drive cylinder 31 and/or from the compressed air tank 25.

Optionally, the exoskeleton device 10 comprises a redirection device 57 which is designed to redirect the support section 3 as the safety measure, in particular such that the support section 3 is moved away from the area in which the user can move his head.

In particular, the exoskeleton 20 redirects the support section 3 in such a way that it cannot hit the body of the user or a person standing nearby.

Furthermore, the movement path of the support section 3 of the exoskeleton 20 is expediently designed in such a way that the support section 3 is moved laterally past the head during the upward movement. This can be attained by the design of the shoulder joint arrangement 9 or implemented by means of one or more actuators. For example, the actuator device 5 can comprise an actuator (in particular in addition to the actuator unit) that is controlled in response to the risk state in order to influence the movement of the support section 3. For example, the shoulder joint arrangement 9 can be aligned, in particular by the actuator, so that the upward-moving support section 3 moves past the user's head; in particular, the shoulder joint arrangement 9 is aligned so that the support section 3 moves on a circular path perpendicular to an axis through the user's shoulders.

Optionally, the control device 7 is configured to communicate with the tool 30 as the safety measure, in particular to cause the tool 30 to be switched off.

Optionally, the control device 7 is configured to perform two or more of the safety measures described above in response to the risk status.

Preferably, the control device 7 is configured to assume a safety state after the safety measure has been carried out, in which safety state the support force is expediently reduced and/or deactivated, and where user input is preferably required to exit the safety state and to provide and/or increase the support force after the safety measure has been carried out. The user input takes place, for example, via the operating element 14 and/or the mobile device 40. Furthermore, the exoskeleton 20 can be designed to slow down an increase in the support force in the safety state or after the user input to end the safety state.

The safety state is used in particular to increase the safety of the user by slowing down the reactivation of the support force after the safety measure has been carried out—in particular after the support force has been switched off—or by requiring that the user must actively switch the support force on again. For example, the user must press a button on the operating element 14 to confirm that the risk state has ended and that work can be resumed safely. It may also be necessary for the user to reset the support force from zero to the desired level, for example by turning a dial on the operating element 14.

Optionally, the exoskeleton 20, in particular the control device 7, is configured to emit a warning signal, for example to alert the user and/or any bystanders by means of the warning signal that the safety measure has been carried out and/or that the safety state has been assumed. Preferably, the warning signal comprises a visual, acoustic and/or vibration signal, in particular a vibration signal provided by the actuator device. For example, the exoskeleton device 10 comprises an output unit for outputting the warning signal.

As explained above, the exoskeleton 20 is designed in particular to actively support the user's arm 4. Alternatively or additionally, the exoskeleton may be designed to actively support another part of the user's body, in particular another limb, for example the user's back, a leg and/or a hand. With such an exoskeleton, there may also be a danger to the user and bystanders due to uncontrolled movement of a respective support section. For example, a support section for a leg can swing backwards unhindered and thus hit and possibly injure a person standing behind the user.

Preferably, when the support force is activated, the exoskeleton 20 is designed to initially switch to a start state in which a maximum value of the support force and/or speed is limited, and only then to switch to normal operation when the risk attachment state can be excluded.

Preferably, the control device 7 has the start state in which the control device 7 effects a limiting measure for limiting a maximum value of the support force and/or a maximum value of the speed of the support section 3 and/or a maximum value of a rate of change of the support force. In particular, as the limiting measure, the control device 7 effects a limitation of a maximum value of a pressure in the drive cylinder 31 and/or a maximum value of a flow rate through the valve unit 24.

Preferably, the control device 7 is configured to terminate the limiting measure in response to leaving the start state, so that the exoskeleton 20 can provide, after leaving the start state, a higher maximum value of the support force and/or a higher maximum value of the speed of the support section 3 and/or a higher maximum value of the rate of change of the support force than in the start state.

Preferably, the control device 7 is configured to assume the start state in response to activation of the support force (in particular by the user). Preferably, the control device 7 is configured to leave the start state and end the limiting measure, in particular by changing to normal operation, in particular in response to the control device 7 determining during a check whether the risk state, in particular the risk attachment state, is present, that no risk state, in particular no risk attachment state, is present, for example in response to the fact that the control device 7 has detected, in particular with the sensor device 6, an attachment of one arm of the user in the arm attachment 12 or an attachment of both arms of the user in both arm attachments.

Figure 5:
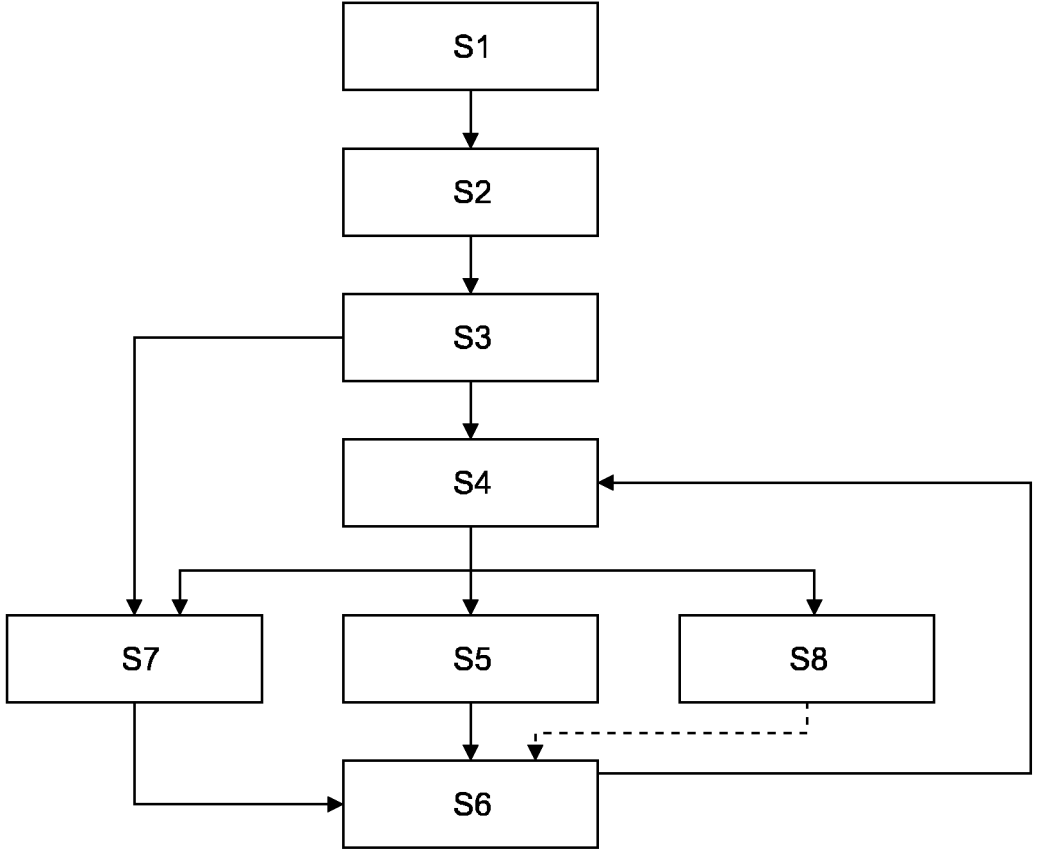

FIG. 5 shows an exemplary flow chart of an operation of the exoskeleton device 10. Preferably, the exoskeleton device 10 is operated with a corresponding method.

In a first step S1, the exoskeleton 20 is switched on, in particular by a user input. The exoskeleton 20 is put into an operational state by switching it on.

In step S2, the support force is activated, in particular by a user input. The exoskeleton 20 is set to the start state. In the start state, the exoskeleton 20 has not yet excluded the risk attachment state. In the risk attachment state, the support force is reduced, in particular greatly reduced, and/or one or more flow rates through the valve unit 24, in particular through one or more pneumatic valves of the valve unit 24, are limited, so that the support force can only increase slowly. In the start state, the exoskeleton 20 checks whether the arm 4 is in the arm shell, for example by checking whether a detected force or a detected pressure exceeds a threshold value, and thus a force application by the user with his arm 4 has been detected, and/or by means of the proximity sensor and/or by means of the system model. If the exoskeleton 20 detects that the arm 4 is not in the arm shell, the exoskeleton 20 determines the risk attachment state.

In the start state, when the exoskeleton 20 recognizes that the arm 4 is in the arm shell, the exoskeleton 20 determines that the risk attachment state is not present and proceeds to the step S4 in which the exoskeleton 20 enters a normal operation. In normal operation, the exoskeleton 20 cancels the limitation of the support force and/or the speed of the support section 3 and/or the flow rate applicable in the starting state. Expediently, during normal operation, the exoskeleton 20 continuously checks whether the risk attachment state, the risk total movement state and/or the risk usage state is present.

If the exoskeleton 20 detects during normal operation that the risk attachment state is present, for example based on the exoskeleton 20 detecting that there is no arm in the arm shell and/or based on a detection of a risk movement, for example a too fast movement, of the support section 3, the exoskeleton 20 proceeds to step S7 and initiates the safety measure, and then expediently proceeds to step S6 (explained below).

Provided that the exoskeleton 20 recognizes in normal operation that the risk total movement state exists, for example based on an acceleration of the base section 1 being greater than a threshold value, the exoskeleton proceeds to the step S5 and initiates the safety measure, and then expediently proceeds to the step S6.

If the exoskeleton 20 detects during normal operation that the risk usage state is present, for example based on detecting a risk movement of the support section 3 (when the presence of the arm in the arm shell is detected) and/or based on a force and/or pressure detected in the arm shell being greater than a threshold value, the exoskeleton proceeds to step S8 and provides feedback to the user to alert the user to the risk movement and/or to cause the user to stop performing the risk movement. Optionally, the exoskeleton 20 initiates the safety measure in step S8, in particular depending on the detected risk movement, and optionally continues with step S6.

If the exoskeleton 20 detects in step S3, in particular in the start state, that the risk attachment state is present, for example because a movement of the support section 3 is too fast or no force exerted by the user on the support section 3 is detected, the exoskeleton 20 continues with step S7 and initiates the safety measure.

In step S6, the exoskeleton 20 assumes the safety state. In response to a user input, for example to increase the support force, the exoskeleton switches to step S4 and assumes normal operation.

The invention claimed is:

1. An exoskeleton device, comprising:
   an exoskeleton, wherein the exoskeleton comprises:
       a base section for attachment to a body section of a human body,
       a support section movably coupled to the base section for supporting a body part of the human body, an actuator device acting on the support section for providing a support force for the body part, wherein the exoskeleton device further comprises:

a sensor device for detecting a risk variable, wherein the risk variable comprises at least one of the following: a movement of the support section, a force between the support section and the body part, and a pressure between the support section and the body part, and a control device for controlling the actuator device, the control device being configured to detect a risk state on a basis of the detected risk variable, in which risk state there is a risk of health impairment and/or damage, and, in response to the detection of the risk state, to initiate a safety measure which comprises outputting a warning signal and/or counteracting the risk state, wherein the risk state comprises a risk movement state in which there is a risk movement of the support section in which there is a risk of the support section hitting a head of a user, and/or wherein the risk state comprises a risk attachment state in which the support section does not support the body part and/or is not attached to the body part.

2. The exoskeleton device according to claim 1, wherein the control device is configured to enter, in response to an activation of the support force, a start state, in which the control device effects a limiting measure for limiting a maximum value of the support force and/or a maximum value of a speed of the support section and/or a maximum value of a rate of change of the support force, and in response to the control device determining that the risk attachment state is not present when checking whether the risk attachment state is present, leaving the start state and terminating the limiting measure.

3. The exoskeleton device according to claim 1, wherein the risk state comprises a risk usage state in which the support section supports the body part and moves at a speed greater than a speed threshold value and/or the force and/or the pressure acts between the support section and the body part, which is greater than a force and/or pressure threshold value, and the control device is configured to detect the risk state on a basis of a comparison of a detected speed of the support section with the speed threshold value and/or on a basis of a comparison of a detected force between the support section and the body part and/or a detected pressure between the support section and the body part with the force and/or pressure threshold value.

4. The exoskeleton device according to claim 1, wherein the sensor device comprises a rotational angular speed sensor and the control device is configured to detect the risk state on the basis of a rotational angular speed of the support section detected by the rotational angular speed sensor.

5. The exoskeleton device according to claim 1, wherein, as the safety measure, the control device is configured to switch the actuator device powerless and/or to bring about active braking of the actuator device and/or to bring about a reduction in the rigidity of the actuator device.

6. The exoskeleton device according to claim 1, further comprising a redirection device adapted to redirect the support section as the safety measure.

7. The exoskeleton device according to claim 1, wherein the control device is configured to detect the risk state on the basis of a comparison of the risk variable with a risk threshold value, wherein the risk threshold value can be set automatically and/or manually by a user.

8. The exoskeleton device according to claim 7, wherein the control device is configured to set the risk threshold value as a function of an angle between the support section and the base section.

9. The exoskeleton device according to claim 7, wherein the control device has at least two manually and/or automatically selectable presets, each of which has at least one preset characteristic which defines a support force specification as a function of at least one input variable, wherein the at least two presets differ in their preset characteristic, and wherein the control device is configured to determine, using a preset selected from the at least two presets, the support force specification as a function of the input variable and to set the support force on the basis of the support force specification, wherein each preset further comprises a respective risk threshold value and the control device is configured to detect the risk state on the basis of the risk threshold value of the selected preset.

10. The exoskeleton device according to claim 1, wherein the control device is configured to adjust the support force as a function of a detected speed of the support section.

11. The exoskeleton device according to claim 1, wherein the warning signal comprises a visual, acoustic and/or a vibration signal.

12. The exoskeleton device according to claim 11, wherein the vibration signal is provided by the actuator device.

13. The exoskeleton device according to claim 1, wherein the base section serves for attachment to a torso of the human body.

14. The exoskeleton device according to claim 1, wherein the support section serves for supporting a limb of the human body.

15. The exoskeleton device according to claim 1, wherein the support section serves for supporting an arm of the human body.

16. The exoskeleton device according to claim 1, wherein the actuator device is a pneumatic actuator device.

17. The exoskeleton device according to claim 1, wherein the risk variable comprises a rotational angular speed and/or a rotational angular acceleration.

18. The exoskeleton device according to claim 1, wherein an input variable is an angle of the support section.

19. An exoskeleton device, comprising:

an exoskeleton, wherein the exoskeleton comprises:

a base section for attachment to a body section of a human body, a support section movably coupled to the base section for supporting a body part of the human body, an actuator device acting on the support section for providing a support force for the body part, wherein the exoskeleton device further comprises:

a sensor device for detecting a risk variable, wherein the risk variable comprises at least one of the following: a movement of the support section, a force, and a pressure between the support section and the body part, and a control device for controlling the actuator device, the control device being configured to detect a risk state on a basis of the detected risk variable, in which risk state there is a risk of health impairment and/or damage, and, in response to the detection of the risk state, to initiate a safety measure which comprises outputting a warning signal and/or counteracting the risk state, wherein the control device is configured to enter a safety state after carrying out the safety measure, in which safety state the support force is reduced and/or deactivated, and wherein a user input is required to leave the safety state and to provide and/or increase the support force after carrying out the safety measure.

20. A method of operating an exoskeleton device, the exoskeleton device, comprising: an exoskeleton, wherein the exoskeleton comprises: a base section for attachment to a body section of a human body, a support section movably coupled to the base section for supporting a body part of the human body, an actuator device acting on the support section for providing a support force for the body part, and wherein the exoskeleton device further comprises: a sensor device for detecting a risk variable, wherein the risk variable comprises at least one of the following: a movement of the support section, a force, and a pressure between the support section and the body part, and a control device for controlling the actuator device, the control device being configured to detect a risk state on a basis of the detected risk variable, in which risk state there is a risk of health impairment and/or damage, and, in response to the detection of the risk state, to initiate a safety measure which comprises outputting a warning signal and/or counteracting the risk state, wherein the risk state comprises a risk movement state in which there is a risk movement of the support section in which there is a risk of the support section hitting a head of a user, and/or wherein the risk state comprises a risk attachment state in which the support section does not support the body part and/or is not attached to the body part, the method comprising the steps of:

detecting the risk variable, detecting the risk state on the basis of the risk variable, initiating the safety measure in response to the detected risk state.

* * * * *